R. H. JACKSON.
CONNECTING ROD.
APPLICATION FILED MAR. 6, 1920.
1,396,435.
Patented Nov. 8, 1921.
2 SHEETS—SHEET 2.
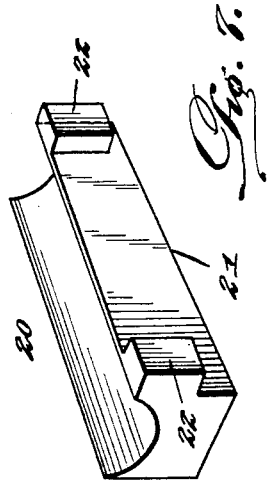
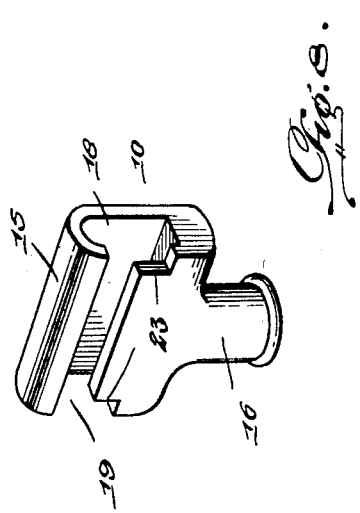
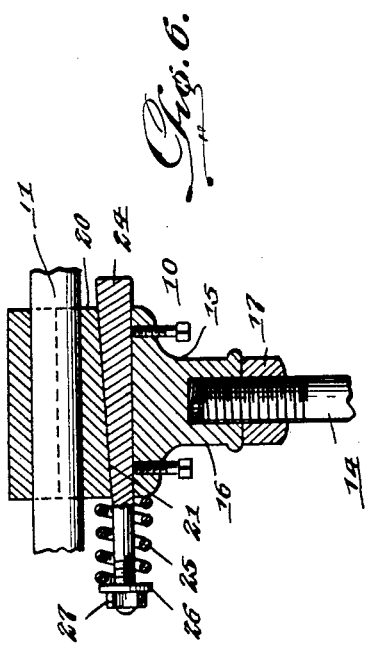
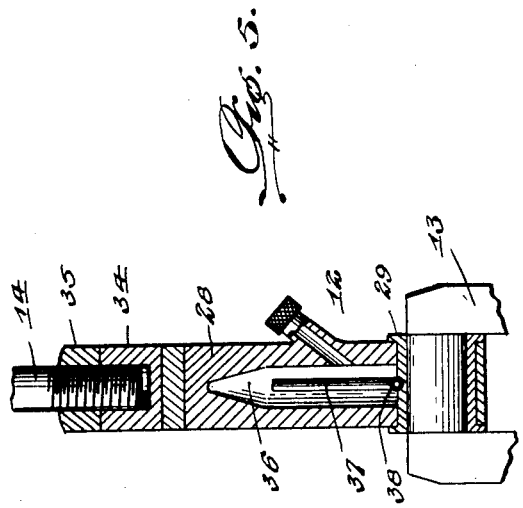
R. H. Jackson
INVENTOR
BY Victor J. Evans
ATTORNEY
WITNESSES:

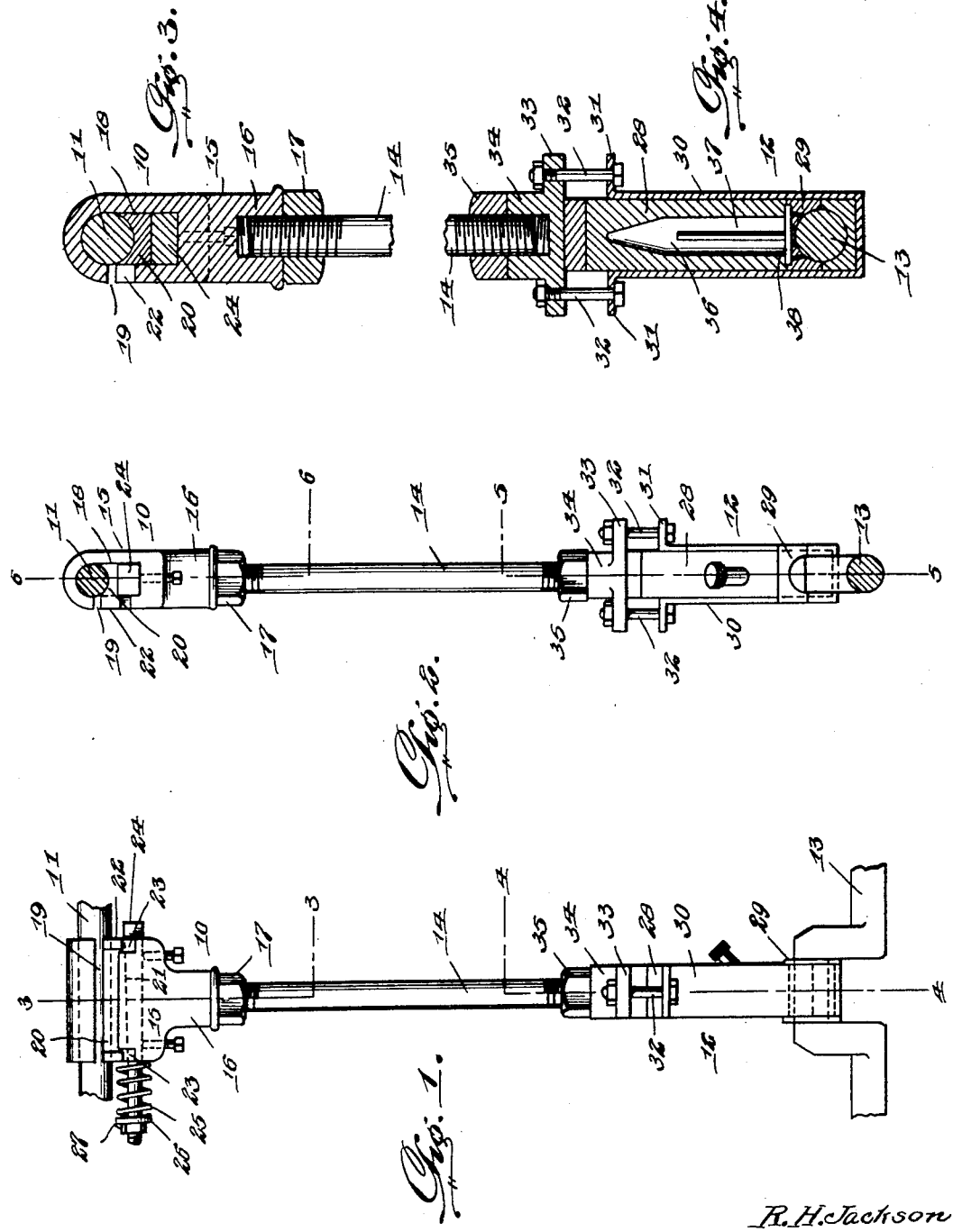

UNITED STATES PATENT OFFICE.

ROBERT H. JACKSON, OF PHOENIX, ARIZONA.

CONNECTING-ROD.

1,396,435.  Specification of Letters Patent.  Patented Nov. 8, 1921.

Application filed March 6, 1920. Serial No. 363,648.

*To all whom it may concern:*

Be it known that I, ROBERT H. JACKSON, a citizen of the United States, residing at Phoenix, in the county of Maricopa and State of Arizona, have invented new and useful Improvements in Connecting-Rods, of which the following is a specification.

This invention relates to improvements in connecting rods especially designed for use in connection with gins or other machines, but capable of use in other capacities, such as for connecting the crank shaft and piston of engines.

An object of the invention is the provision of a connecting rod in which the wrist pin bearing is automatically adjusted to take up wear, to provide a proper working fit between the pin and rod.

Another object is the provision of a connecting rod which is also adjustable longitudinally to increase or decrease the length of the rod.

A further object is the provision of means for lubricating the crank shaft connection or bearing, which is located at one end of the rod.

With the above and other objects in view, the invention further includes the following novel features and details of construction, to be hereinafter more fully described, illustrated in the accompanying drawings, and specifically pointed out in the appended claims.

In the drawings:

Figure 1 is a view in elevation illustrating the connecting rod.

Fig. 2 is an elevation at right angles to Fig. 1.

Fig. 3 is an enlarged sectional view on the line 3—3 of Fig. 1.

Fig. 4 is a similar view on the line 4—4 of Fig. 1.

Fig. 5 is an enlarged detail sectional view on the line 5—5 of Fig. 2.

Fig. 6 is a similar view on the line 6—6 of Fig. 2.

Fig. 7 is a detail perspective view of the bearing wedge for the wrist pin bearing.

Fig. 8 is a like view of the bearing casing which receives the wedge.

Referring to the drawings in detail, like characters of reference denote corresponding parts throughout the several views.

In the embodiment of the invention herein illustrated, there is shown a rod in which is included a bearing 10 adapted for connection with a wrist pin 11 or similar member, a bearing 12 which is adapted for connection with a crank shaft 13 and a rod 14, which connects the bearings 10 and 12.

The bearing 10 comprises a casing 15 which is provided with an internally threaded extension 16, by means of which it may be connected to one end of the rod 14, being held in adjusted position by means of the locked nut 17. The casing 15 is provided with a transversely arranged elongated slot 18, which is preferably open at one side as indicated at 19, the wrist pin 11 being positioned at and having a bearing in one end of this slot. Located within the slot 18 is a movable bearing wedge 20, one side of this wedge being concaved so as to complete the bearing for the pin 11, while its opposite side edge is tapered as shown at 21. In order to hold the bearing edge 20 against lateral movement with respect to the connecting rod proper, this wedge is provided at each end with a lug 22, which is adapted to slide in and engage the walls of notches 23 located at each end of the casing 15. Also located within the slot 18 is a tapered pin 24, which acts to force the wedge 20 into proper working engagement with the wrist pin 11, the engagement being controlled by a spring 25, which surrounds one end of the pin 24 and has one end bearing against the casing 15. The opposite end of the spring 25 bears against a washer 26, the tension of the spring being adjusted by means of a nut 27. By this means wear in the bearing will be automatically taken up.

The bearing 12 comprises a block 28 which carries at one end a bushing 29, for contact with the crank of the shaft 13, a similar bushing being positioned upon the opposite side of the crank and being held in position within a stop 30. The stops 30 are provided with apertured ears 31 through which pass bolts 32, the said bolts also passing through apertured ears 33 formed upon an internally threaded connecting member or coupling 34. This coupling is threaded upon the rod 14 and is held in position by means of a lock nut 35, while the end of the coupling member 34 bears against the end of the block 28.

The block 28 is provided with an oil chamber or reservoir 36, within which extends a distributing pipe 37, the latter being provided with branches 38 to distribute the lubricant to each side of the bearing.

It will be seen from the foregoing description and the accompanying drawings, that the bearing 10 is constructed so as to automatically take up wear, and that the length of the connecting rod may be adjusted by loosening the lock nuts 17 and 35 and rotating the rod 14, the threads at the opposite ends of which are oppositely inclined.

The invention is susceptible of various changes in its form, proportions and minor details of construction, and the right is herein reserved to make such changes as properly fall within the scope of the appended claims.

Having described the invention what is claimed is:—

1. A self adjusting bearing comprising a casing having a slot in one face which extends the entire length of said casing to provide a shaft engaging seat, a take-up block engageable with the shaft and movable transversely of the casing, laterally extending lugs located at each end of the block and engageable with notches formed in the casing at each end of the slot to prevent longitudinal movement of the block and means for adjustably holding the block against transverse movement.

2. A self adjusting bearing comprising a casing having a slot in one face which extends the entire length of said casing to provide a shaft engaging seat, a take-up block engageable with the shaft and movable transversely of the casing, a longitudinally movable wedge located within the casing and engaging the block to hold the latter in position, a pin extending from one end of the wedge, a spring surrounding the pin and engaging the block and casing to urge the take-up block in a direction toward the shaft and means for adjusting the tension of the spring.

In testimony whereof I affix my signature.

ROBERT H. JACKSON.